US007571267B1

(12) United States Patent
Luis

(10) Patent No.: US 7,571,267 B1
(45) Date of Patent: Aug. 4, 2009

(54) CORE CLOCK ALIGNMENT CIRCUITS THAT UTILIZE CLOCK PHASE LEARNING OPERATIONS TO ACHIEVE ACCURATE CLOCKING OF DATA DERIVED FROM SERIAL DATA STREAMS HAVING DIFFERENT RELATIVE SKEWS

(75) Inventor: Brad Luis, Duluth, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 319 days.

(21) Appl. No.: 11/389,748

(22) Filed: Mar. 27, 2006

(51) Int. Cl.
*G06F 13/12* (2006.01)
*G06F 3/00* (2006.01)
*G06F 1/12* (2006.01)
*H04L 7/00* (2006.01)

(52) U.S. Cl. .............................. 710/62; 710/61; 710/71; 713/375; 713/400; 713/503

(58) Field of Classification Search ................... 710/62
See application file for complete search history.

(56) References Cited

U.S. PATENT DOCUMENTS 6,208,667 B1 * 3/2001 Caldara et al. .............. 370/503
6,650,141 B2 * 11/2003 Agrawal et al. ............... 326/41

(Continued)

FOREIGN PATENT DOCUMENTS

EP          1 521 179 A      4/2005

(Continued)

OTHER PUBLICATIONS

Demerjian, Charlie, "Intel FB-DIMMs to offer real memory breakthroughs, Part One Fully buffered DIMMs take shape," http://www.theinquirer.net/print.aspx?article=15167&print=1, Printed Apr. 5, 2005, 2 pages.

(Continued)

*Primary Examiner*—Henry W. H. Tsai
*Assistant Examiner*—Michael Sun
(74) *Attorney, Agent, or Firm*—Myers Bigel Sibley & Sajovec

(57) ABSTRACT

Core clock alignment circuits include a serial-in parallel-out (SIPO) data processing circuit, which is configured to generate a plurality of lanes of deserialized data in response to a corresponding plurality of lanes of serialized data. The SIPO data processing circuit is further configured to generate a plurality of recovered clock signals from corresponding ones of the plurality of lanes of serialized data. These recovered clock signals may be out-of-phase relative to each other. The devices also include a plurality of lane FIFOs, which are configured to receive respective ones of the plurality of lanes of deserialized data and respective ones of the plurality of recovered clock signals at write ports thereof. A core clock alignment circuit is provided, which may be electrically coupled to the plurality of lane FIFOs. The core clock alignment circuit is configured to perform clock phase learning operations to generate a core clock in response to detecting a plurality of training state headers received by the plurality of lane FIFOs. This core clock may be provided to read ports of the plurality of lane FIFOs to thereby synchronize FIFO read operations.

14 Claims, 5 Drawing Sheets

U.S. PATENT DOCUMENTS

| | | | |
|---|---|---|---|
| 6,748,549 B1 * | 6/2004 | Chao et al. | 713/401 |
| 7,003,066 B1 * | 2/2006 | Davies et al. | 375/376 |
| 7,180,972 B1 * | 2/2007 | Venkata et al. | 375/371 |
| 7,330,502 B2 * | 2/2008 | Hotta | 375/221 |
| 7,356,756 B1 * | 4/2008 | Chan et al. | 714/781 |
| 2002/0075981 A1 * | 6/2002 | Tang et al. | 375/372 |
| 2003/0117864 A1 | 6/2003 | Hampel et al. | |
| 2003/0122696 A1 | 7/2003 | Johnson et al. | |
| 2004/0105292 A1 | 6/2004 | Matsui | |
| 2004/0236877 A1 | 11/2004 | Burton | |
| 2007/0006011 A1 * | 1/2007 | Martin et al. | 713/503 |

FOREIGN PATENT DOCUMENTS

| | | |
|---|---|---|
| JP | 2004 139552 A | 5/2004 |

OTHER PUBLICATIONS

Demerjian, Charlie, "There's magic in the Intel FB-DIMM old buffer, Part Two Memory technologies," http://www.theinquirer.net/print.aspx?article=15189&print=1, Printed Apr. 5, 2005, 4 pages.

Demerjian, Charlie, "The beauty of Intel's FB-DIMM architecture, Part Three Conclusion," http:/www.theinquirer.net/print.aspx?article=15214&print=1, Printed Apr. 5, 2005, 4 pages.

"Advanced Memory Buffer," NEC Electronics America, Inc., http://www.necelam.com/interface/index.php?Subject=AMB, Printed Apr. 4, 2005, 2 pages.

"Moore, Moore, Moore—New Advanced Memory Buffer," ee Product Center, http://www.eeproductcenter.com/printableArticle.jhtml;jsessionid=CZQ4WRFBFNHLAQS..., Printed Apr. 4, 2005, 3 pages.

"NEC Electronics Showcases Advanced Memory Buffer Technology as a Key Enabling Technology for Increased Bandwidths and Large Memory Capacities at IDF Spring 2005", Press Release: Mar. 1, 2005, http://www.necel.com/en/news/archive/0503/0102.html, Printed Apr. 5, 2005, 2 pages.

"What'an AMB (Advance Memory Buffer)?," NEC Electronics, http://www.necel.com/cgi-bin/print/print.cgi?h=/en.techhighlights/amb/market_needs.html, Printed Apr. 4, 2005, 2 pages.

Razavi, Behzad, "Design of Monolithic Phase-Locked Loops and Clock Recovery Circuits—A Tutorial", published in Monolithic Phase-Locked Loops and Clock Recovery Circuits: Theory and Design, Wiley-IEEE Press, ISBN:0-7803-1149-3, pp. 33-36, Apr. 1996.

"Advanced Memory Buffer, µPD720900 Supports Fully Buffered DIMM Interface," Sep. 2005, NEC Electronics America, Inc., 2 pages.

"Simmtester.com" http://www.simmtester.com/page/news/printerFormat.asp?num=113&mmd=814116, CST Publications, Copyright 2005, CST, Inc., 4 pages.

NEC Electronics America—Semiconductor Solutions, http://www.am.necel.com/interface/index.php?Subject=AMB, 2005 NEC Electronics, 2 pages.

Vogt, Pete, Fully Buffered DIMM (FB-DIMM) Server Memory Architecture, Intel Corp., Feb. 18, 2004, 33 pages.

David et al., "Fully Buffered DIMM (FB-DIMM) Design Consideration," Intel Corp., Feb. 18, 2004, 36 pages.

* cited by examiner

CORE CLOCK ALIGNMENT CIRCUITS THAT UTILIZE CLOCK PHASE LEARNING OPERATIONS TO ACHIEVE ACCURATE CLOCKING OF DATA DERIVED FROM SERIAL DATA STREAMS HAVING DIFFERENT RELATIVE SKEWS

FIELD OF THE INVENTION

The present invention relates to integrated circuit devices and, more particularly, to integrated circuit devices having clock generators therein and methods of generating clock signals.

BACKGROUND OF THE INVENTION

Conventional techniques may be used to accurately recover a clock signal from a pair of synchronized differential data signals (DATA and /DATA) provided onto a data bus by an upstream integrated circuit device. However, accurate clock synchronization can be more difficult to achieve when multiple out-of-phase clock signals are recovered from corresponding pairs of data signals having different relative timing skews. This is particularly true for high speed devices requiring accurate and aggressive (i.e., early) phasing of a high speed internal core clock used to synchronize a large number of data signals having potentially significantly different timing skews. One such high speed device is an advanced memory buffer (AMB), which may be used in fully-buffered DIMM modules. As known to those skilled in the art, the AMB may be configured to receive as many as ten (10) lanes of serialized data at 4.0-Gbps or higher data rates before deserializing and deskewing operations are performed on the data. A conventional technique to achieve internal core clock synchronization with deserialized and deskewed data includes generating an internal clock signal that is always synchronized with the deserialized data having a worst skew characteristic (i.e., greatest lagging skew relative to an earliest lane of data). Unfortunately, such a conventional synchronization technique may not be sufficiently aggressive for devices operating at the highest required rates of operation because no adjustment can be made to the phase of the generated internal clock signal.

SUMMARY OF THE INVENTION

Integrated circuit devices according to embodiments of the present invention include a serial-in parallel-out (SIPO) data processing circuit, which is configured to generate a plurality of lanes of deserialized data in response to a corresponding plurality of lanes of serialized data. The SIPO data processing circuit is further configured to generate a plurality of recovered clock signals from corresponding ones of the plurality of lanes of serialized data. These recovered clock signals may be out-of-phase relative to each other. The devices also include a plurality of lane FIFOs, which are configured to receive respective ones of the plurality of lanes of deserialized data and respective ones of the plurality of recovered clock signals at write ports thereof. A core clock alignment circuit is provided, which may be electrically coupled to the plurality of lane FIFOs. In particular, the core clock alignment circuit can be electrically coupled to read ports of the plurality of lane FIFOs. These read ports include read data terminals and read clock terminals. The core clock alignment circuit is configured to perform clock phase learning operations to thereby generate a core clock in response to detecting a plurality of training state headers received by the plurality of lane FIFOs. This core clock may be provided to read ports of the plurality of lane FIFOs to thereby synchronize FIFO read operations across the plurality of lane FIFOs.

According to some of these embodiments, the core clock alignment circuit is configured to generate a plurality of training state header detection signals in response to detecting a corresponding plurality of training state headers received by the plurality of lane FIFOs during learning operations. These training state header detection signals may be generated by comparators that are configured to compare headers received by the plurality of lane FIFOs against a predetermined training header stored within the core clock alignment circuit. According to additional embodiments of the invention, the core clock alignment circuit includes a clock generator that is reset in response to a leading edge of one of the plurality of training state header detection signals generated during the clock phase learning operations. This clock generator may also be switched from a reset condition to an enabled condition in response to a trailing edge of another one of the plurality of training state header detection signals generated during the clock phase learning operations.

According to still further embodiments of the invention, the clock generator includes a divide-by-N counter. This divide-by-N counter is configured to generate a plurality of phases of a clock signal having a frequency equal to 1/N times a frequency of an internal clock signal received by the clock generator. This internal clock signal may be a high frequency clock signal that is generated by a phase-locked loop (PLL) integrated circuit. The core clock alignment circuit is further configured to evaluate multiple ones of the plurality of phases of the clock signal as core clock "candidates" during the clock phase learning operations and then select one of the core clock candidates as the preferred core clock. This selection operation is performed in response to identifying which one of the core clock candidates has an earliest phase that supports reading of valid data from all the read ports of said plurality of lane FIFOs.

DETAILED DESCRIPTION OF PREFERRED EMBODIMENTS

Figure 1:
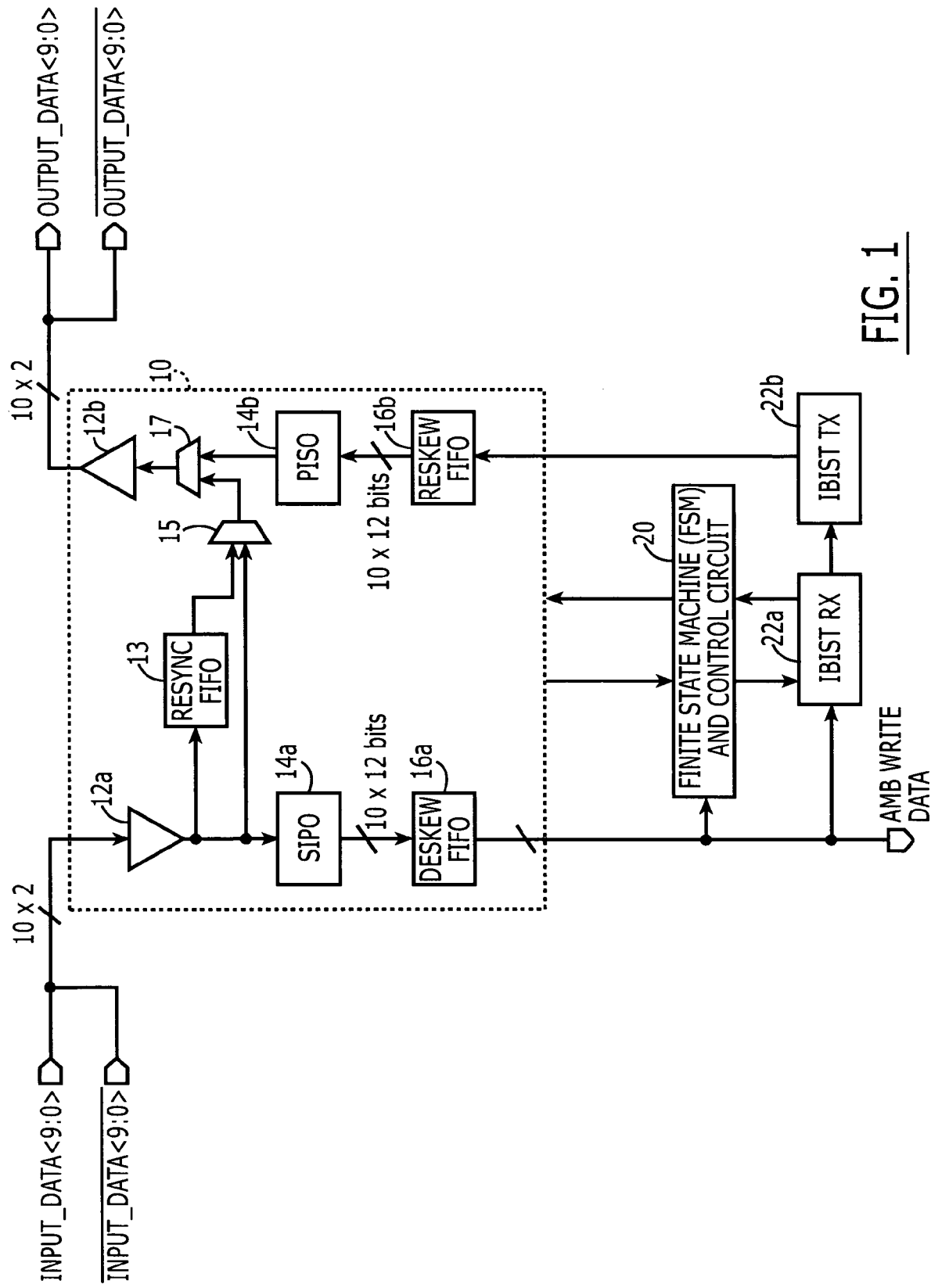
FIG. 1 is a block diagram of a portion of an advanced memory buffer (AMB) that is configured to process southbound (i.e., primary) data lanes, according to embodiments of the present invention.

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals. The suffix B (or prefix symbol "/") to a signal name may also denote a complementary data or information signal or an active low control signal, for example.

Referring now to FIG. 1, a southbound data lane processing circuit 10 of an advanced memory buffer (AMB) is illustrated as including: (I) data bypass circuitry, which is configured to process a plurality of differential data lanes (INPUT_DATA<9:0>, /INPUT_DATA<9:0>) and (OUTPUT_DATA<9:0>, /OUTPUT_DATA<9:0>); (ii) a de-serializer circuit and (iii) a serializer circuit. The data lane processing circuit 10 operates under at least partial control of a finite state machine (FSM) and control circuit 20. The data bypass circuitry may include input and output buffers 12a, 12b, a plurality of multiplexers 15, 17 and a resync FIFO 13, connected as illustrated. The data bypass circuitry performs bypass routing operations that are well known to those skilled in the art and need not be described further herein.

The de-serializer circuit is illustrated as including a serial-in/parallel-out (SIPO) data processor circuit 14a and a deskew FIFO 16a. The serializer circuit is illustrated as including a parallel-in/serial-out (PISO) data processor circuit 14b and a reskew FIFO 16b. The SIPO data processor circuit 14a performs operations to convert ten pairs of lanes of serial data into ten lanes of parallel data, with a serial-to-parallel ratio of 12:1 (i.e., 12 consecutive bits of serial data are converted into each 12-bit frame of parallel data). The SIPO data processor circuit 14a also performs operations to generate recovered clock signals from the lanes of serial data. Techniques for recovering clock signals from serial data are disclosed in an article by Behzad Razavi entitled "Design of Monolithic Phase-Locked Loops and Clock Recovery Circuits—A Tutorial", which is published in a book entitled "Monolithic Phase-Locked Loops and Clock Recovery Circuits Theory and Design, Wiley-IEEE Press, ISBN:0-7803-1149-3, pp. 33-36, April (1996), the disclosure of which is hereby incorporate herein by reference. The output of the SIPO data processor circuit 14a is electrically coupled to a write port of the deskew FIFO 16a having ten separate lane FIFOs therein (see, e.g., FIG. 2). This write port includes both write data and write clock terminals. The write clock terminals receive ten recovered clock signals from the SIPO data processor circuit 14a.

Data captured by the deskew FIFO 16a is passed as AMB write data to additional buffering circuitry (not shown) within the AMB. This captured data may also be routed into a built-in self test (BIST) receiver 22a so that internal built-in self test operations may be performed within the finite state machine and control circuit 20. This BIST receiver 22a may also generate control signals that are passed to a built-in self test (BIST) transmitter 22b. This BIST transmitter 22b may generate test vectors that are provided in sequence to the reskew FIFO 16b and PISO data processor circuit 14b and then to the output southbound data lanes (OUTPUT_DATA<9:0>, /OUTPUT_DATA<9:0>). The test vectors may then be received and processed by a downstream device(s) (not shown).

Figure 2:
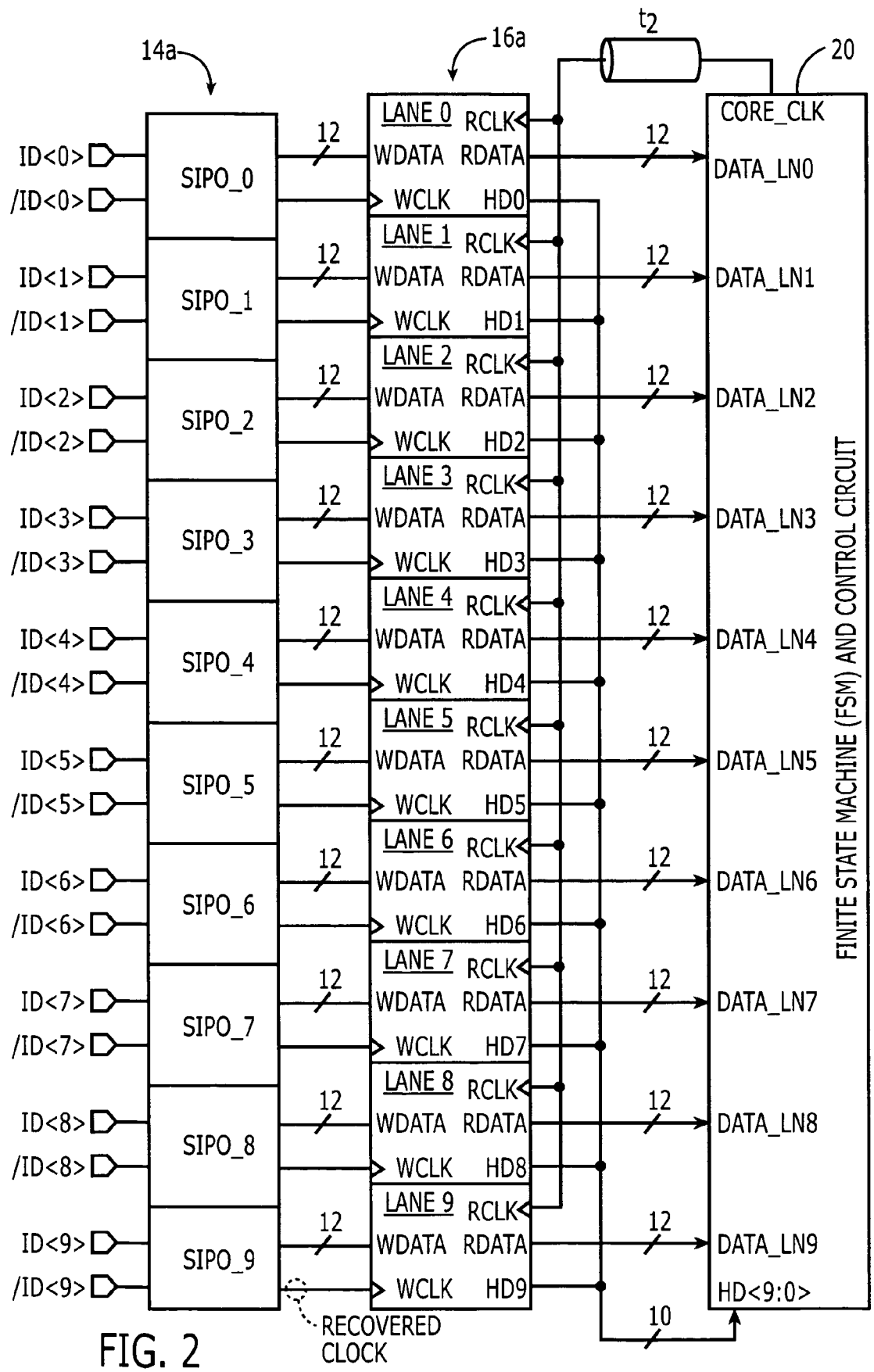
FIG. 2 is a block diagram of a de-serializer circuit and a clock alignment circuit, according to embodiments of the present invention.
Figure 3:
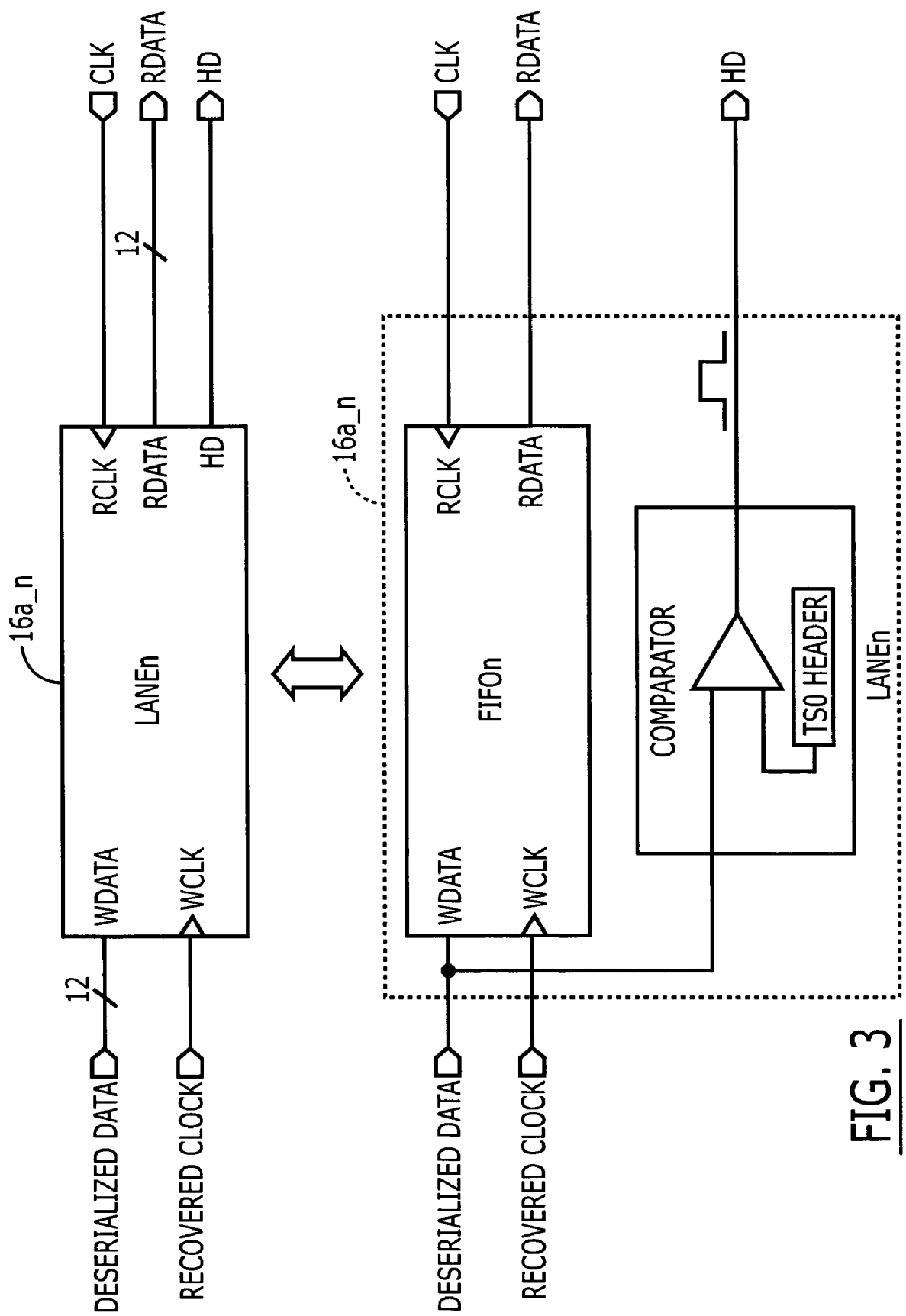
FIG. 3 is a block diagram illustrating a portion of a multi-lane deskew FIFO of FIG. 2, according to embodiments of the present invention.

Referring now to FIGS. 1-3, the SIPO data processor circuit 14a is illustrated as including a plurality of SIPO cells (SIPO_0 to SIPO_9), which are configured to receive respective pairs of serialized data streams (shown as ID<9:0>, /ID<9:0>). In response, the SIPO cells generate respective lanes of deserialized data on respective 12-bit buses. These lanes of deserialized data are provided to corresponding write ports of lane FIFOs (FIFOn) within the deskew FIFO 16a. This deskew FIFO 16a is illustrated in FIG. 3 as including a plurality of lane processing circuits 16a_n, for "n" in a range from 0 to 9. The SIPO cells also generate corresponding clock signals that are recovered from respective pairs of serialized data streams. These clock signals, which are typically out-of-phase (i.e., skewed) relative to each other by potentially substantial time intervals, are provided to respective write clock terminals (WCLK) of the associated lane FIFOs (FIFO0 to FIFO9).

Each of the lane processing circuits 16a_n may also include a respective comparator, which is treated herein as a component of a core clock alignment circuit. As illustrated by FIG. 3, each comparator is configured to generate a corresponding training state header detection signal (shown as an active high pulse HD) in response to detecting an equivalency between a stored multi-bit header (e.g., 12-bit TS0 header, which operates as a training vector) and a training header (e.g., 12-bit header) received at the write data port of a corresponding lane FIFOn during a clock phase learning operation, which may occur during a start-up time interval.

Figure 4:
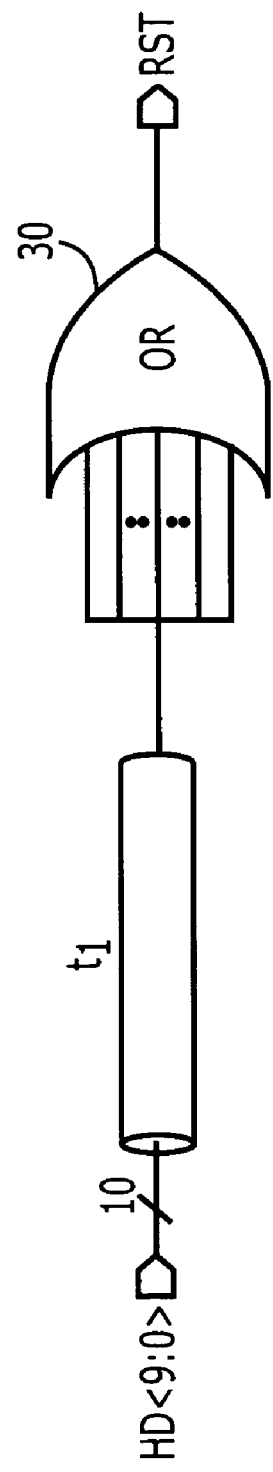
FIG. 4 is a block diagram of a portion of the clock alignment circuit of FIG. 2, according to embodiments of the present invention
Figure 4:
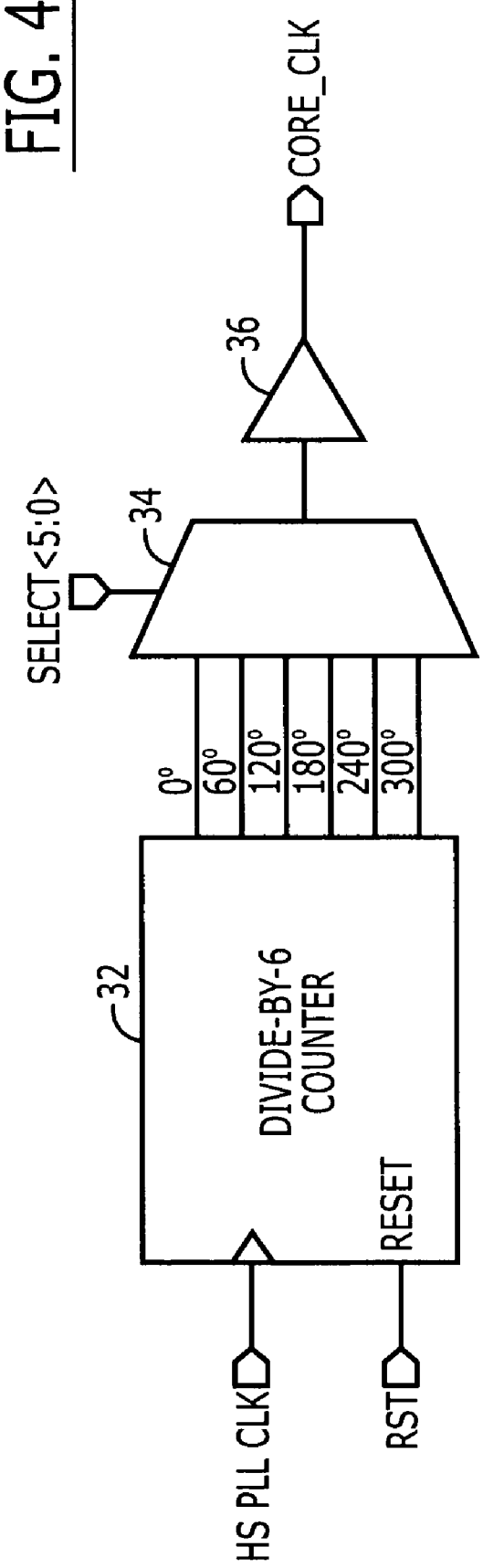

Referring now to FIGS. 2 and 4, the header detection signals HD<9:0> are passed along corresponding signal lines to the finite state machine and control circuit 20, which also receives read data (RDATA) from the read ports of the lane FIFOs within the deskew FIFO 16a. These signal lines may provide variable and possibly significant delays based on signal line length. These delays are collectively identified by the time value t1 associated with a transmission line element. The header detection signals HD<9:0> are received at input terminals of a logic gate 30 (e.g., OR gate), which is configured to generate a reset signal RST. This reset signal RST may be an active high pulse having a leading edge that is synchronized with a corresponding one of the header detection signals HD<9:0> having an earliest low-to-high transition and a trailing edge that is synchronized with another header detection signal making the last high-to-low transition during a clock phase learning operation. This configuration of components requires that the header detection signals have sufficiently wide pulses that all active header detection signals overlap each other in time. This overlap requirement means that the widths of the HD pulses be sufficient to cover the maximum skew the lane processing circuit 10 is expected to handle.

This reset signal RST is provided as a control input to a divide-by-N counter 32 (where N=6 in the illustrated embodiment), which is synchronized with a high frequency internal clock signal (shown as HS PLL CLK). This divide-by-N counter 32 is shown as generating six candidate core clock signals, having equivalently spaced phases (shown as 0°, 60°, 120°, 180°, 240° and 300°), however, a divide-by-N counter capable of generating a greater number of phases may also be used in combination with a select signal having a greater number of bits (e.g., an N value equal to 8 would correspond to an 8-bit select signal that selects one of the following phases: 315, 270, 225, 180, 135, 90, 45 and 0).

As described more fully hereinbelow with respect to FIG. 5, one of the candidate core clock signals is selected as a core clock signal (CORE_CLK) within the finite state machine and control circuit 20, which operates as, among other things, a core clock alignment circuit. In particular, this core clock signal CORE_CLK is selected in response to the generation of a select signal (e.g., SELECT<5:0>), which is passed to a control input of a multiplexer 34 having a clock buffer 36 at an output thereof. As illustrated by FIG. 2, this core clock signal CORE_CLK is passed to the read clock terminals (RCLK) of the lane FIFOs. The clock signal line responsible for passing the core clock signal CORE_CLK may have a delay of t2 associated therewith.

Figure 5:
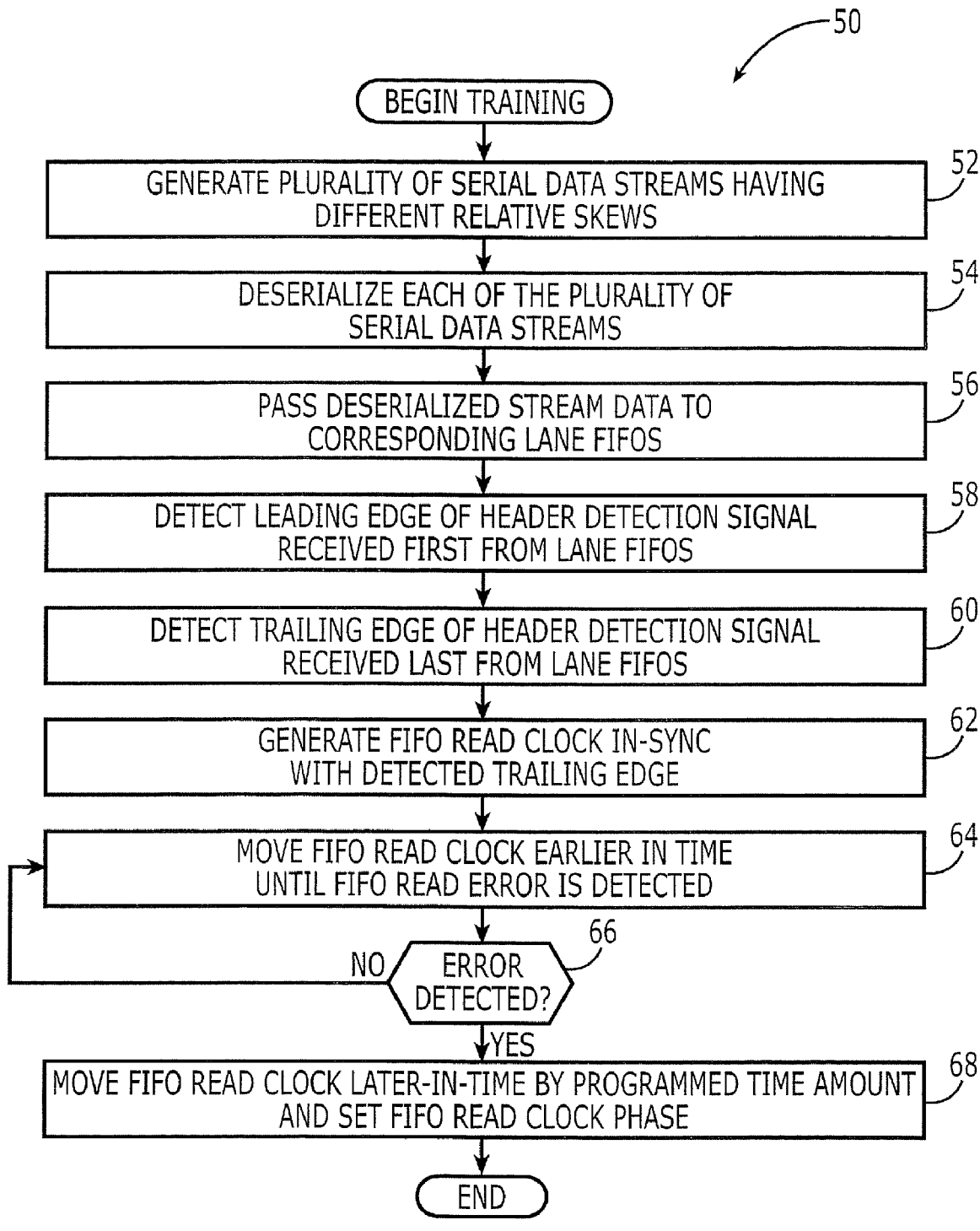
FIG. 5 is a flow diagram that illustrates operations performed by the de-serializer and core clock alignment circuits of FIG. 2.

Referring now specifically to FIG. 5, operations 50 to perform core clock alignment using clock phase learning operations include generating a plurality of serial data streams (e.g., test data streams) having different relative skews, Block 52. Examples of these serial data streams are illustrated as ID<9:0> and /ID<9:0> in FIG. 2. The SIPO data processor circuit 14a performs operations to deserialize and recover clock signals from each of the plurality of serial data streams, Block 54. These deserialized data streams are passed to a corresponding plurality of lane FIFOs within respective lane processing circuits 16a_n, Block 56. During clock phase learning operations, which may occur during a start-up time interval within an AMB, training headers (including TS0 headers) are provided within the serial data streams and passed to corresponding comparators within the lane processing circuits 16a_n. In response to these TS0 headers, the comparators generate respective training state header detection signals HD<9:0> having leading edges (e.g., low-to-high edges of pulses) that are out of phase relative to each other in accordance with the out-of-phase relationship of the serial data streams. These comparators and the finite state machine (FSM)/control circuit 20 perform the operations of a core clock alignment circuit. As illustrated by FIG. 4, the reset signal RST switches from a normally low state to a high state in-sync with a leading edge of a header detection signal (HD) having an earliest low-to-high transition during the learning operations. Stated alternatively, this earliest low-to-high transition of a HD signal is generated in response to the earliest TS0 header received by the processing circuit 10 of FIG. 1 upon commencement of the learning operations. The low-to-high transition of the reset signal, which operates to reset the divide-by-N counter 32, represents a detection of a header detection signal HDn ($0 \leq n \leq 9$) received first from the lane FIFOs, Block 58. The logic gate 30 of FIG. 4 is also configured to switch the reset signal RST from a high state to a low state in-sync with a trailing edge of another header detection signal making the last high-to-low transition during the learning operations. This high-to-low transition of the reset signal RST, which enables resynchronization of the divide-by-N counter 32, represents a detection of a trailing edge of a header detection signal received last from the lane FIFOs, Block 60.

The high-to-low transition of the reset signal RST during the learning operations causes a restart of the divide-by-N counter 32 and a generation of a first core clock signal as an initial FIFO read clock, Block 62. In the illustrated embodiment, this first core clock signal may have a frequency equal to 1/6 times a frequency of HS PLL CLK and a lagging phase equal to 300°. This lagging phase of 300° is set by the 6-bit select signal SELECT<5:0> generated within a portion of the FSM/control circuit 20 operating as the clock alignment circuit. Thereafter, as illustrated by Blocks 64 and 66, the FSM/control circuit 20 performs operations to sequentially reduce a lagging phase of the core clock signal in increments of 60° (i.e., 300°→240°→180°→120°→60°→0°) until a parallel read operation from all the lane FIFOs during a learning operation results in the generation of at least one read data error. This sequential reduction in phase represents a selection of different core clock candidates generated by the counter 32. This detection of a read error by the FSM/control circuit 20 causes the FSM/control circuit 20 to increment the value of the select signal SELECT<5:0> to thereby select a next greater lagging phase of a candidate core clock signal as the resetting core clock CORE_CLK, Block 68, which is to be used by the system upon termination of the learning operation. Thus, as an example, if a candidate core clock signal having a lagging phase of 120° first caused a read error during the learning operations, then the candidate clock signal generated at a lagging phase of 180° by the counter 32 would be next selected as the most aggressively phased core clock signal CORE_CLK capable of supporting accurate read operations from all the lane FIFOs.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit device, comprising:
a serial-in parallel-out (SIPO) data processing circuit configured to generate a plurality of lanes of deserialized data in response to a corresponding plurality of lanes of serialized data that are out-of-phase relative to each other and further configured to generate a plurality of recovered clock signals from corresponding ones of the plurality of lanes of serialized data;
a plurality of lane FIFOs configured to receive respective ones of the plurality of lanes of deserialized data and respective ones of the plurality of recovered clock signals at write ports thereof; and
a core clock alignment circuit electrically coupled to read ports of said plurality of lane FIFOs, said core clock alignment circuit configured to perform clock phase learning operations to generate a core clock in response to detecting a plurality of training state headers received as data by corresponding ones of said plurality of lane FIFOs and further configured to provide the core clock to the read ports of said plurality of lane FIFOs, said clock phase learning operations comprising:
testing a plurality of out-of-phase core clock candidates that are generated in response to a first one of the plurality of training state headers associated with a first one of the plurality of lanes of serialized data; and
selecting one of the plurality of out-of-phase core clock candidates as the core clock in response to detecting an error during an operation to read data in parallel from all of said plurality of lane FIFOs using another one of the plurality of out-of-phase core clock candidates as a read clock during the operation to read data in parallel from all of said plurality of lane FIFOs.

2. The device of claim 1, wherein said core clock alignment circuit is configured to generate a plurality of training state header detection signals in response to detecting a corresponding plurality of training state headers received by said plurality of lane FIFOs.

3. The device of claim 2, wherein said core clock alignment circuit comprises a clock generator that is switched and held in a reset condition in response to a leading edge of one of the plurality of training state header detection signals generated during the clock phase learning operations.

4. The device of claim 3, wherein said core clock alignment circuit is configured so that the clock generator is switched from the reset condition to an enabled condition in response to a trailing edge of another one of the plurality of training state header detection signals generated during the clock phase learning operations.

5. The device of claim 2, wherein said core clock alignment circuit comprises a plurality of comparators configured to compare headers received by said plurality of lane FIFOs against a training header stored within the device.

6. The device of claim 3, wherein the clock generator comprises a divide-by-N counter configured to generate a plurality of phases of a clock signal having a frequency equal to 1/N times a frequency of a clock signal received by the clock generator.

7. The device of claim 6, wherein said core clock alignment circuit is further configured to select, as the core clock, one of the plurality of core clock candidates having a next earlier phase relative to another one of the plurality of core clock candidates having a phase that caused the error during the operation to read data in parallel from said plurality of lane FIFOs.

8. An integrated circuit device, comprising:
a plurality of lane FIFOs; and
a clock alignment circuit electrically coupled to read and write ports of said plurality of lane FIFOs, said core clock alignment circuit configured to perform clock phase learning operations to thereby generate a core clock in response to detecting a plurality of out-of-phase training state headers received as data at the write ports of said plurality of lane FIFOs and further configured to provide the core clock to the read ports of said plurality of lane FIFOs, said clock phase learning operations comprising:
testing a plurality of core clock candidates having unequal phases, said plurality of core clock candidates generated in response to termination of a last one of the plurality of training state headers received by the integrated circuit device during a training phase of operation; and
selecting one of the plurality of core clock candidates as the core clock in response to detecting an error during an operation to read data in parallel from all of said plurality of lane FIFOs, including all lane FIFOs that received a corresponding training state header having a leading phase relative to the last one of the plurality of training state headers.

9. The device of claim 8, wherein said core clock alignment circuit is configured to generate a plurality of training state header detection signals in response to detecting a corresponding plurality of training state headers received by said plurality of lane FIFOs.

10. The device of claim 9, wherein said core clock alignment circuit comprises a clock generator that is switched to and held in a reset condition in response to a leading edge of one of the plurality of training state header detection signals generated during the clock phase learning operations.

11. The device of claim 10, wherein said core clock alignment circuit is configured so that the clock generator is switched from the reset condition to an enabled condition in response to a trailing edge of another one of the plurality of training state header detection signals generated during the clock phase learning operations.

12. The device of claim 9, wherein said core clock alignment circuit comprises a plurality of comparators configured to compare headers received by said plurality of lane FIFOs against a training header stored within the device.

13. The device of claim 10, wherein the clock generator comprises a divide-by-N counter configured to generate a plurality of phases of a clock signal having a frequency equal to 1/N times a frequency of a clock signal received by the clock generator.

14. The device of claim 13, wherein said core clock alignment circuit is further configured to select, as the core clock, one of the plurality of core clock candidates having a next earlier phase relative to another one of the plurality of core clock candidates having a phase that caused the error during the operation to read data in parallel from said plurality of lane FIFOs.

* * * * *